US009725028B1

(12) United States Patent
Etzkorn

(10) Patent No.: US 9,725,028 B1
(45) Date of Patent: Aug. 8, 2017

(54) MAGNETIC FASTENER FOR CARGO RETENTION

(71) Applicant: Etzkorn Enterprises, LLC, Commerce, TX (US)

(72) Inventor: Josh T. Etzkorn, Commerce, TX (US)

(73) Assignee: Etzkorn Enterprises, LLC, Commerce, TX (US)

( * ) Notice: Subject to any disclaimer, the term of this patent is extended or adjusted under 35 U.S.C. 154(b) by 7 days.

(21) Appl. No.: 14/319,835

(22) Filed: Jun. 30, 2014

Related U.S. Application Data

(60) Provisional application No. 61/840,968, filed on Jun. 28, 2013.

(51) Int. Cl.
*B60P 7/08* (2006.01)
*F16B 45/00* (2006.01)
*B60P 7/06* (2006.01)

(52) U.S. Cl.
CPC .............. *B60P 7/0823* (2013.01); *B60P 7/06* (2013.01); *F16B 45/00* (2013.01); *Y10T 24/32* (2015.01)

(58) Field of Classification Search
CPC .......... B60P 7/06; B60P 7/0823; Y10T 24/32; F16B 45/00
USPC ................. 24/265 H, 716, 369, 371, 303
See application file for complete search history.

(56) References Cited

U.S. PATENT DOCUMENTS

| | | | | |
|---|---|---|---|---|
| 2,630,155 A * | 3/1953 | Kandel | .................. | B60C 27/14 144/24.16 |
| 3,293,714 A | 12/1966 | Shafer | | |
| 4,235,272 A * | 11/1980 | Landsrath | ............... | B60C 27/16 152/213 R |
| 5,553,981 A | 9/1996 | Braden | | |
| 5,779,206 A * | 7/1998 | Harris | ................... | A47B 96/06 248/214 |
| 2006/0177282 A1 | 8/2006 | Blosser | | |
| 2009/0041557 A1* | 2/2009 | Lin | .......................... | B60J 7/104 410/97 |
| 2009/0272862 A1* | 11/2009 | Pinchuk | ................... | A47G 1/20 248/206.5 |
| 2010/0215455 A1* | 8/2010 | Burris | ................... | B65D 63/10 410/100 |
| 2011/0083254 A1* | 4/2011 | Trutna | .................... | A41F 1/002 2/326 |
| 2016/0003269 A1* | 1/2016 | Russell-Clarke | ....... | A41F 1/002 24/303 |

* cited by examiner

*Primary Examiner* — Abigail Troy
(74) *Attorney, Agent, or Firm* — Michael S. Young IP Law LLC; Michael S. Young

(57) ABSTRACT

An apparatus, system, and method of using the apparatus and system may generally include a strap or retention device. A first end of a fastener is operatively coupled to the strap that is configured to retain a cargo contactingly adjacent a cargo support surface. A second end of the fastener is operatively coupled to the first end. The second end has an inner surface and an opposing, outer surface. The inner surface provides a recess feature configured to receive a magnet that is configured to support the second end adjacent a side of the cargo support surface. The inner surface provides a recess feature configured to receive a magnet that is configured to support the second end adjacent a side of the cargo support surface, wherein the side does not produce its own magnetic field.

7 Claims, 19 Drawing Sheets

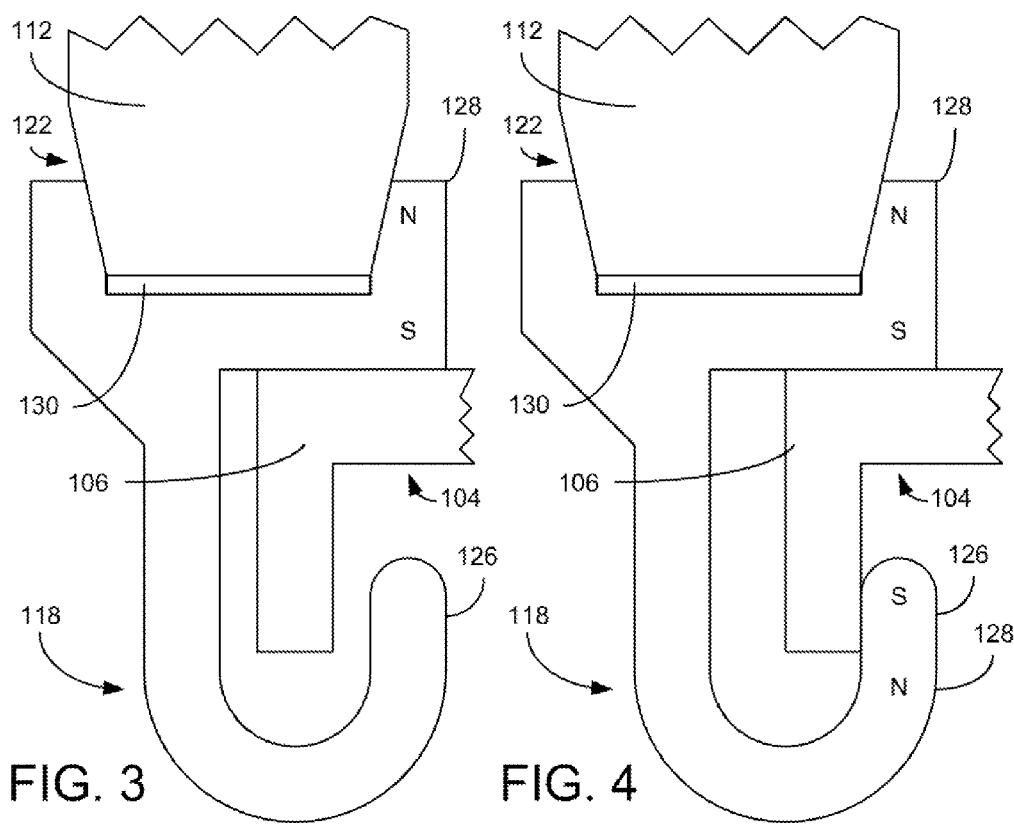
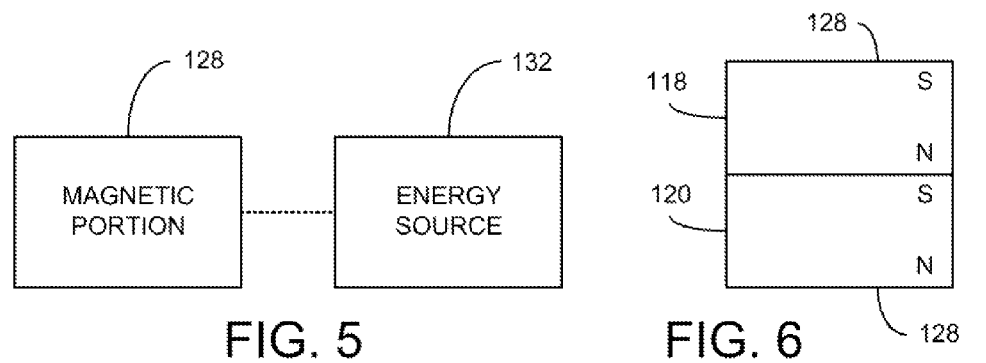

MAGNETIC FASTENER FOR CARGO RETENTION

RELATED APPLICATIONS

This application claims priority to U.S. Provisional Patent Application No. 61/840,968 filed on Jun. 28, 2013, entitled "MAGNETIC FASTENER FOR CARGO RETENTION," the contents of which are incorporated herein by reference.

SUMMARY

Various embodiments of the present disclosure are generally directed to a magnetic fastener for a cargo retention system, apparatus and method.

In some embodiments, an apparatus may generally include a strap. A fastener is operatively coupled to the strap. The fastener includes a magnetic portion and a mechanical portion. A tightening member is operatively coupled to the strap. The magnetic portion removably secures the fastener contactingly adjacent a surface before operation of the tightening member. The mechanical portion removably secures the fastener contactingly adjacent the surface after operation of the tightening member to tighten the strap in relation to the surface.

BRIEF DESCRIPTION OF THE DRAWINGS

FIG. 3 displays a close-up view of certain aspects of FIG. 1.

FIG. 4 illustrates a close-up view of certain aspects of FIG. 1

FIG. 5 demonstrates certain aspects of a magnetic fastener for cargo retention in accordance with various embodiments of the present disclosure.

FIG. 6 shows certain aspects of a magnetic fastener for cargo retention in accordance with various embodiments of the present disclosure.

DETAILED DESCRIPTION

The present disclosure generally relates to a magnetic fastener for a cargo retention apparatus, system and method to secure a cargo to a cargo support surface. The cargo may be a shipping container, vehicle, payload, etc. Further, the cargo may be conveyed in a transportation device, such as a ship, airplane or vehicle. The cargo may be secured to a structure not designed to easily move, such as a relatively immobile warehouse shelf.

A cargo retention device, also known herein as a tie-down strap or simply strap, may be removably attachable to the cargo support surface, so that the tie-down strap can be used with different cargo support surfaces without destruction of the tie-down strap when moved from one cargo support surface to another support cargo support surface. An operator may wish to have an efficient way to apply the tie-down strap to the cargo support structure to secure or restrain the cargo.

Figure 1:
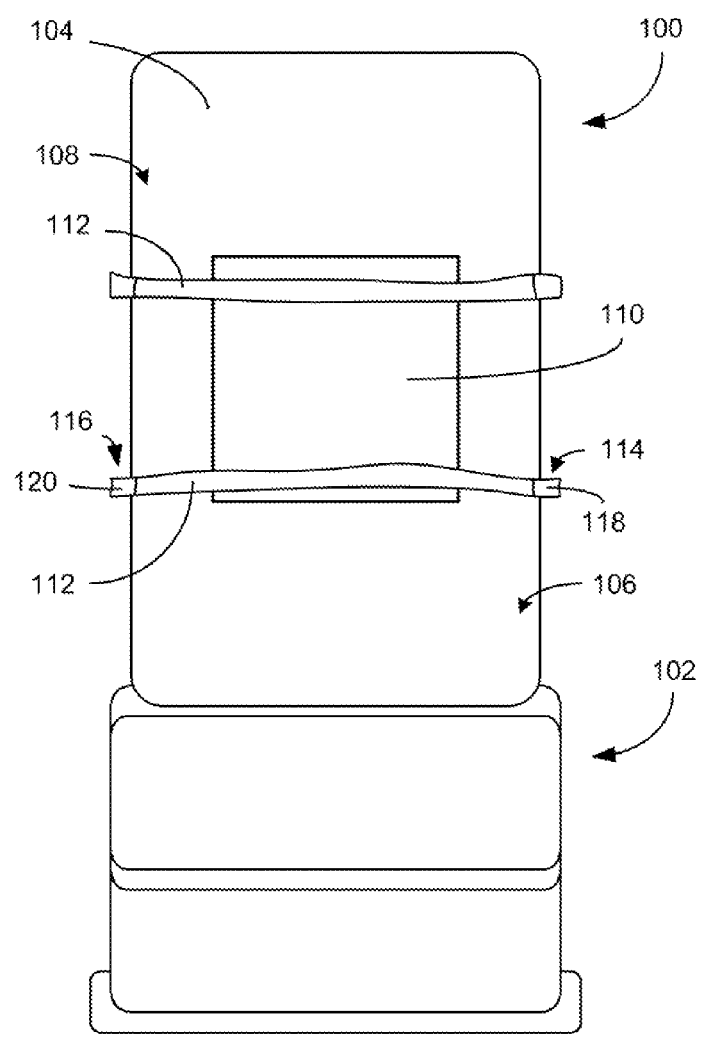
FIG. 1 shows a plan view of a magnetic fastener for cargo retention in accordance with various embodiments of the present disclosure.

These and other features and benefits of the present disclosure can be understood beginning with a review of FIG. 1 that depicts a magnetic fastener for a cargo retention system 100. The magnetic fastener for a cargo retention system 100 may be used in conjunction with a transportation device 102, such as a vehicle, by way of concrete example but not by way of limitation. Of course, the magnetic fastener for a cargo retention system 100 may be used with relatively immobile or even stationary structure, also.

The magnetic fastener for the cargo retention system 100 may incorporate a number of elements including a cargo support surface 104. The cargo support surface 104 may include a first side 106 and an opposing second side 108. A cargo 110 can be secured to the cargo support surface 104 by removable attachment of a strap 112. One or more cargo 110 may be secured to the cargo support surface 104. The strap 112 is made of any suitable flexible material, such as polymer, cloth, rope, etc. One or more straps 112 may be used to secure the cargo 110 to the cargo support surface 104.

The strap 112 has a first end 114 and a second end 116. Further, the strap 112 has a first fastener 118 and a second fastener 120. The plurality of fasteners may be more than 2. The first fastener 118 and the second fastener 120 may be attached to the first end 114 and the second end 116, respectively. Alternatively, the first fastener 118 or the second fastener 120 or both may be attached to the strap 112 at locations other than the end of the strap 112.

The first fastener 118 may be attached to first side 106 of the cargo support surface 104, and then the second fastener 120 and the strap 112 are thrown, tossed or otherwise delivered to the opposing second side 108 of the cargo support surface 104. Typically, the cargo 110 will already be on the cargo support surface 104 when the second fastener 120 is thrown to the opposing second side 108, but the cargo 110 may be placed on the cargo support surface 104 after the second fastener 120 is thrown to the opposing second side 108.

Figure 2:
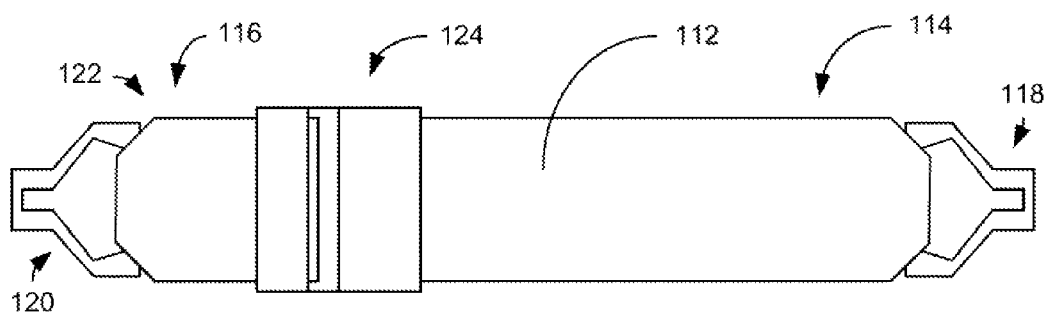
FIG. 2 illustrates a plan view of certain aspects of FIG. 1.

FIG. 2 shows the strap 112 in more detail. The first end 114 and the second end 116 may each include a loop 122, or other suitable structure, to retain the first fastener 118 and the second fastener 120, respectively. The strap 112 may be adapted to restrain a cargo 110 on a transportation device 102, such as the ship, the plane, the vehicle.

When the strap 112 is put in operation, there is likely to be some slack in the strap 112. With too much slack in the strap 112, the cargo 110 (see FIG. 1) may not be properly restrained by the strap 112. Slack may be removed from the strap 112 by any suitable manner. A skilled artisan would understand that a common method to remove slack from the strap 112 is a tightening member 124. The tightening member 124 may secure the cargo 110 contactingly adjacent the cargo support surface 104.

The tightening member 124 may be configured to apply tension to the strap 112. One such tightening member could be a ratchet mechanism, which is a mechanical device that allows continuous linear or rotary motion in a first direction while preventing motion in an opposing second direction. The ratchet mechanism may be releasable to permit motion in the opposing second direction. A ratchet mechanism is just one of several tightening members that can be used to remove slack in the strap 112 and are contemplated. For example, the tightening member 124 may be a winch assembly.

FIG. 3 illustrates an exemplary embodiment of the first fastener 118, which could also be an exemplary embodiment for the second fastener 120. The first fastener 118 may provide a mechanical portion 126 and a magnetic portion 128. The strap 112 may capture the first fastener 118 with a loop 122 that passes through an aperture 130 of the first fastener 118.

The mechanical portion 126 is configured for engagement with the first side 106 of the cargo support surface 104. When the strap 112 is tightened, or cinched, into position to remove slack from the strap 112, the mechanical portion 126 engages a cargo support surface 104, or some feature connected to the cargo support surface, to secure the cargo 110 (see FIG. 1).

The magnetic portion 128 may be separate from the mechanical portion 126 or may be integral to the mechanical portion 126 as shown in FIG. 4. The magnetic portion 128 may serve to engage the cargo support surface 104 when the first fastener 118 engages the cargo support surface 104. The mechanical portion 126 may not be able to maintain the engagement of the first fastener 118 with the cargo support surface 104 when the strap 112 is thrown such that the second fastener 120 may be brought into engagement with the cargo support surface 104. Of course, the mechanical portion 126 may alternatively be able to maintain the engagement of the first fastener 118 with the cargo support surface 104 when the strap 112 is thrown.

The magnetic portion 128 may only supply a magnet with a magnetic field that is strong enough to support engagement of the first fastener 118 with the cargo support surface 104 during the time the strap 112 is thrown. The magnetic portion 128 may not supply a magnet with a magnetic field that is strong enough to supplement the mechanical portion 126 when the strap 112 secures the cargo 110 against the cargo support surface 104. Alternatively, the magnetic portion 128 may supply a magnet with a magnetic field that effectively supplements the mechanical portion 126 when the strap 112 secures the cargo 110 against the cargo support surface 104.

The mechanical portion 126 may fail to secure the first fastener 118 contactingly adjacent the cargo support surface 104 before operation of the tightening member 124. Further, the magnetic portion 128 may fail to secure the first fastener 118 contactingly adjacent the cargo support surface 104 after operation of the tightening member 124.

For example, FIG. 3 shows a configuration where the magnetic portion 128 is at a mechanical disadvantage such that the magnetic portion 128 may be pulled away from engagement with the cargo support surface 104 when the strap 112 is tightened around the cargo 110. On the other hand, FIG. 4 shows a configuration where the magnetic portion 128 is at a mechanical advantage such that the magnetic portion 128 may be pulled into further engagement with the cargo support surface 104 when the strap is tightened around the cargo 110. One skilled in the art can envision further embodiments, which would be in keeping with the spirit of the present disclosure.

The skilled artisan will understand the standard convention that N stands for the north pole and S stands for the south pole for the magnetic portion 128 shown in FIGS. 3-4. Of course the north pole and south pole could be reversed in orientation in the magnetic portion 128.

FIG. 5 demonstrates that the magnetic portion 128 may be achieved through use of one or more magnets. A magnet is an object that produces a magnetic field. A permanent magnet is an object made from a material that is magnetized and creates its own persistent magnetic field. A permanent magnet retains its magnetism and does not lose its magnetic field. Permanent magnets can be made from substances like naturally occurring mineral, e.g., magnetite ($Fe_3O_4$), or synthetic substance, e.g., neodymium. Ferromagnetic materials are materials that can be magnetized to form permanent magnets. Exemplary ferromagnetic materials include iron, nickel, cobalt, and rare Earth materials.

In addition, the magnet can be an electromagnet, which is a device that acts as a magnet when an electric current passes through the device but stops acting as a magnet when the electric current stops passing through the device. The electromagnet needs an energy source 132. The energy source 132 could be a battery (rechargeable or non-rechargeable), power takeoff (PTO) from the transportation device, etc.

The magnetic portion 128 may be ferromagnetic. In addition, the magnetic portion 128 may be an electromagnet. Further, the magnetic portion 128 may be a permanent magnet. The mechanical portion 126 may itself be magnetic.

The cargo support surface may be made of material that may be responsive to magnetic fields produced by the magnetic portion. For example, the cargo support surface may be made of ferromagnetic material, such as iron or steel. The cargo support surface may or may not be made of material that produces its own magnetic fields.

FIG. 6 illustrates the magnetic portions 128 may not only function when the strap 112 is in secure relationship to the cargo support surface 104 (see FIG. 1). The magnetic portions 128 may help organize the first fastener 118 and the second fastener 120 by letting the fasteners be stacked together, such as during storage of the strap 112 when the strap 112 is not in use retaining the cargo 110. Other configurations of the magnetic portions 128 of course are possible and in keeping with the spirit of the present disclosure.

In certain embodiments, the magnetic fastener for cargo retention system 100 may include several elements. The elements may include a transportation device 102. Further, the magnetic fastener for cargo retention system 100 may include the strap 112 configured for removable attachment to the transportation device 102. In addition, the magnetic fastener for cargo retention system 100 may include the first fastener 118 operatively coupled to the strap 112. Furthermore, the magnetic fastener for cargo retention system 100 may include the first fastener 118 that has a magnetic-mechanical portion, or the mechanical portion 126 and the magnetic portion 128. The magnetic-mechanical portion can be considered the mechanical portion 126 that is magnetic. Further, the magnetic fastener for cargo retention system 100 may include the second fastener 120 operatively coupled to the strap 112. The second fastener may have the mechanical portion 126. Furthermore, the magnetic fastener for cargo retention system 100 may include a tightening member 124 operatively coupled to the strap 112. The first fastener 118 may removably secure, by magnetic or mechanical interactions or combination of both magnetic and mechanical interactions, the strap 112 to the transportation device 102 before operation of the tightening member 124. The second fastener 120 may removably secure, by mechanical interactions, the strap 112 to the transportation device 102 after operation of the tightening member 124 tightens the strap 112 in relation to the transportation device 102.

Figure 7:
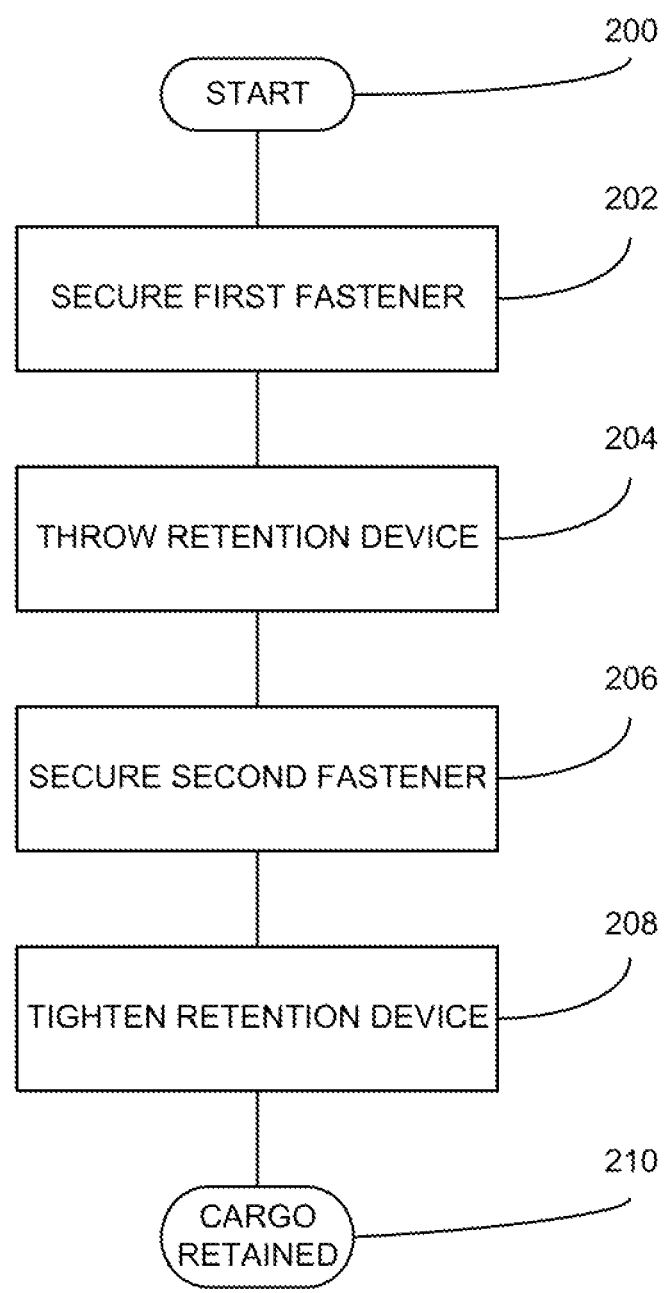
FIG. 7 provides a flow chart for a method of using MAGNETIC FASTENER FOR CARGO RETENTION in accordance with various embodiments of the present disclosure.

FIG. 7 shows a flow chart for demonstrating a method of using MAGNETIC FASTENER FOR CARGO RETENTION. The method begins at step 200.

At step 202, the first fastener (such as the first fastener 118 in FIG. 1) is secured in relation to the cargo support surface (such as the cargo support surface 104 in FIG. 1) adjacent the first side. The secure engagement of the first fastener to the cargo support surface is achieved through use of the magnetic portion (such as the magnetic portion 128 in FIGS. 3-4) of the first fastener. The secure engagement of the first fastener to the cargo support surface may be supplemented through use of the mechanical portion (such as the mechanical portion 126 in FIGS. 3-4) of the fastener.

At step 204, the strap (such as the strap 112 in FIG. 1) is thrown across the cargo support surface. By throwing the strap across the cargo support surface, the second fastener (such as the second fastener 120 in FIG. 1) is brought closer to the opposing second side (such as the opposing second side 108 in FIG. 1) of the cargo support surface. During this throwing step and continuing until the strap secures a cargo (such as the cargo 110 in FIG. 1) against the cargo support surface, the magnetic portion helps maintain the first fastener in secure engagement with the cargo support surface. This secure engagement may reduce the number of times that the operator needs to secure the first fastener and throw the strap, because the first fastener is less likely to disengage the cargo support surface. This secure engagement may be performed more efficiently through use of the magnetic fastener for cargo retention.

At step 206, the second fastener is brought into engagement with the cargo support surface. The second fastener may or may not have the magnetic portion to help maintain engagement of the second fastener with the cargo support structure.

At step 208, the tightening member (such as the tightening member 124 in FIG. 2) is operated to effectively remove slack from the strap 112. In removing the slack from the strap, the cargo is secured and retained adjacent the cargo support surface. With the cargo retained adjacent the cargo support surface, the magnetic portions may or may not supplement the mechanical portions to maintain the first fastener and the second fastener in secure engagement with the cargo support surface.

At step 210, the cargo is retained by the strap against the cargo support surface and the method ends.

Further embodiments of the magnetic fastener for cargo retention system 100 are contemplated and may be used in accordance with the method of using magnetic fastener for cargo retention.

Figure 8:
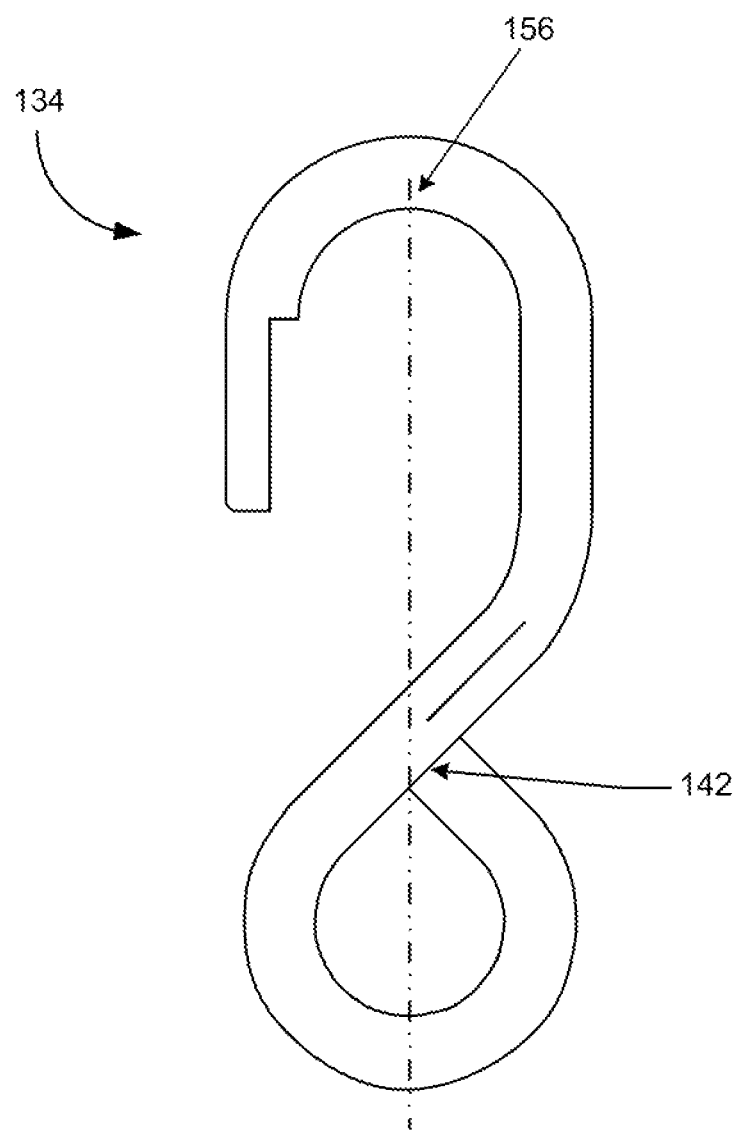
FIG. 8 shows a side view of certain aspects of a magnetic fastener for cargo retention in accordance with various embodiments of the present disclosure.
Figure 9:
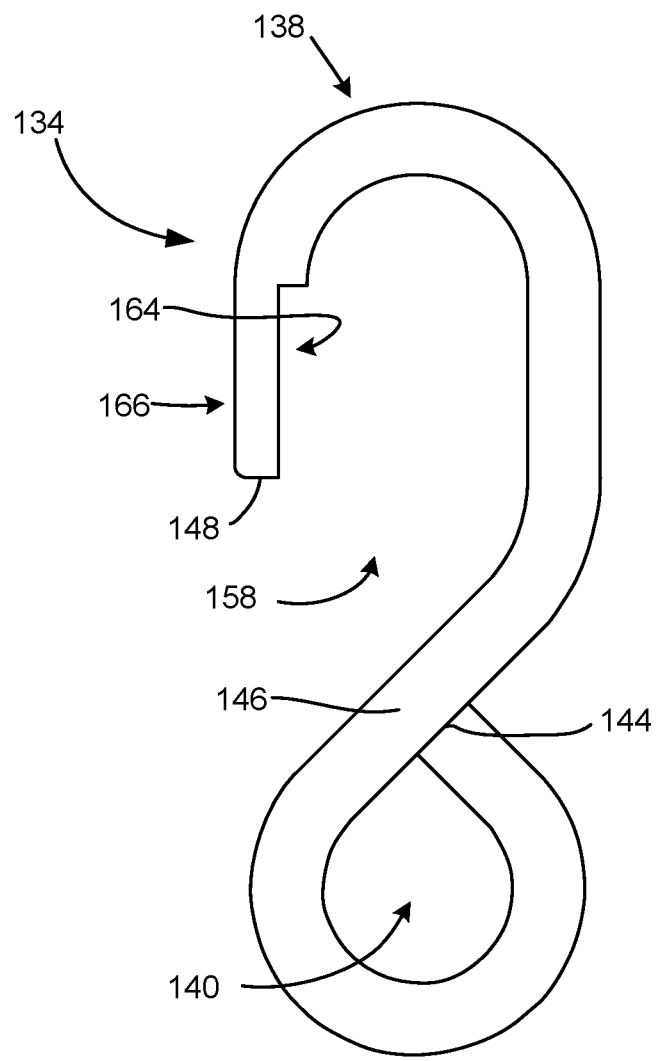
FIG. 9 illustrates a further side view of certain aspects of FIG. 8.
Figure 10:
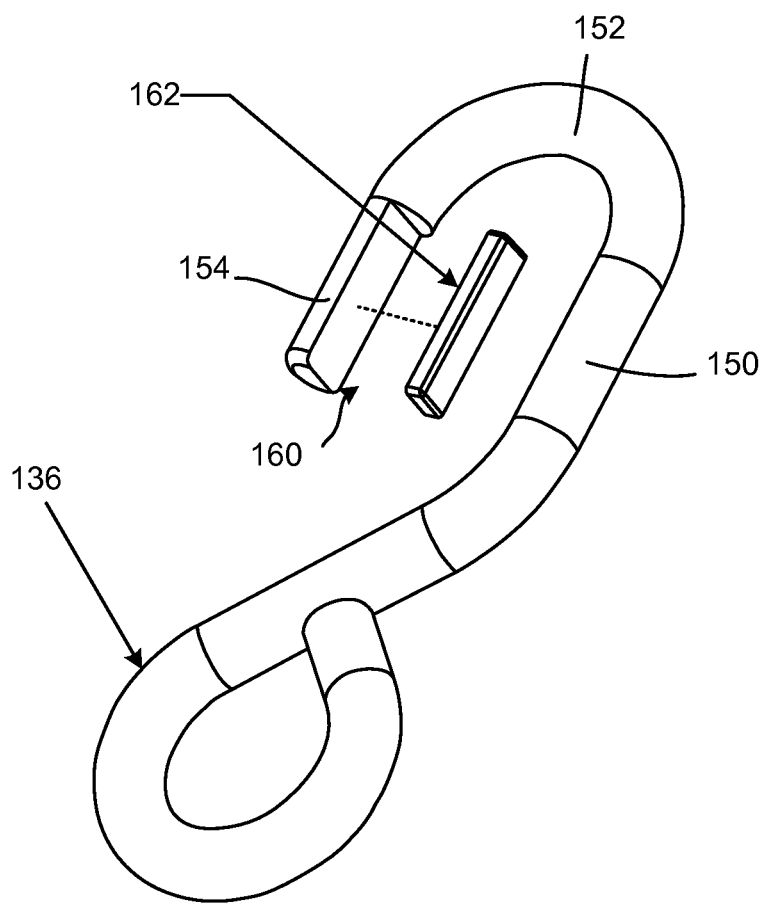
FIG. 10 displays an exploded perspective view of certain aspects of FIG. 8.

FIGS. 8-10 show various views of a magnetic fastener for cargo retention in accordance with various embodiments of the present disclosure. A fastener 134 is made from steel, aluminum, polymer, or other suitable material. The fastener 134 may be formed by any suitable technique, including, but not limited to stamping, bending, casting, machining, injection molding, and/or die casting. The fastener 134 may be treated to be corrosion resistant, and may include a suitable protective covering, such as, but not limited to plating, painting, anodizing, epoxy coating, and/or powder coating.

The fastener 134 has a strap retention portion 136 and a hook portion 138. The strap retention portion 136 provides an aperture 140 is configured to retain the strap 112 used to secure the cargo 110 when the fastener 134 engages the cargo support surface 104 (see FIG. 1). A gap 142 between a first end 144 and a central body 146 of the fastener 134 may be minimized to reduce the chance that the strap 112 will no longer be retained.

At the opposing, second end 148 of the fastener 134, the hook portion 138 may be further subdivided into 3 portions: an extension portion 150, a stop portion 152, and a retainer portion 154. The extension portion 150 may be formed integral with the central body 146, and the extension portion 150 extends from the central body 146. The extension portion 150 may be substantially parallel to a long axis 156 of the fastener 134, although other orientations are contemplated. The stop portion 152 may be formed integral with the extension portion 150. The stop portion 152 may be configured to contactingly engage the cargo support surface 104 when the fastener 134 is attached to the cargo support surface 104. The stop portion 152 may be substantially perpendicular to the long axis 156 of the fastener 134, although other orientations are contemplated. The retainer portion 154 may be formed integral with the stop portion 152. The retainer portion 152 may be substantially parallel to the extension portion 150, although other orientations are contemplated. An open channel 158, which has a generally U-shaped cross-section, may be formed by the extension portion 150, the stop portion 152, and the retainer portion 154.

The retainer portion 154 has a recess feature 160 that may be formed by machining a portion of the material away from the rod used to form the fastener 134, or the recess feature 160 may be formed when casting the fastener 134. Other production techniques are contemplated.

The recess feature 160 is configured to receive a magnet 162. The magnet 162 may be a permanent magnet or other suitable magnet disclosed. The magnet 162 is secured in the recess feature 160 in any suitable manner, such as, but not limited to, a snap-in configuration, adhesive bonding, molding or mechanical fastener (e.g., rivet, screw, etc.). The magnet 162 may be secured in the recess feature 162 such that the magnet 162 remains within the confines of the volume defined by the rod of the fastener 134. By staying within the volume, the magnet 162 is less likely to be pulled off the fastener 134 or out of the recess feature 160 during use.

Using a permanent magnet in the fastener 134 may increase the effective working magnetic lifespan of the fastener 134 in comparison to magnetizing the fastener 134. For example, the fastener 134 may comprise a ferromagnetic material that does not produce a magnetic field. The ferromagnetic material could be magnetized to produce a magnetic field. However, the magnetic field produced by the magnetized ferromagnetic material may not last as long as a permanent magnet. Or more practically, the magnetic field produced by the magnetized ferromagnetic material may not last a long as the strap 112 to which the fastener 134 is coupled. By using a permanent magnet, the effective working lifespan of the fastener 134 for cargo retention system may be increased.

The recess feature 16) may be viewed as being on an inner side (also known as inner surface) 164 of the hook portion 138. An outer side (also known as outer surface) 166 of the hook portion 138 is opposite the inner side 164. By positioning the recess feature 160 on the inner surface 164, the magnet 162 will be more closely adjacent, and possibly even contactingly adjacent, the cargo support surface 104 when the fastener 134 is in use. By being closely adjacent the cargo support surface 164, the magnet 162 is positioned to better hold the fastener 134 securely adjacent the cargo support surface 104, such that the strap 112 may be more effective in securing the cargo 110 adjacent the cargo support surface 164. Any suitable dimensions may be used for the fastener 134.

A variety of magnets may be used for the magnet 162 in this embodiment and the other embodiments of the present disclosure. The magnet may have a magnetic pull force of about 4 pounds to about 12 pounds. The magnet may have a magnetic pull force of about 8 pounds. The magnet may include a pair of magnets, and the magnetic pull force of each magnet in the pair of magnets may be about 8 pounds to about 12 pounds. The magnet may include a pair of magnets, and each magnet in the pair of magnets may have a magnetic pull force of about 12 pounds.

The following examples were developed using magnets obtained from an online reseller, Applied Magnets, but other sources exist.

Example 1: N45 Rare Earth Magnets 0.5"×0.25"×1/16" neodymium block. The ½ inch length was a little short to substantially cover a fill vertical portion, i.e., the retainer portion, of the hook portion of a length chosen for certain embodiments of the fastener. However, the depth of 1/16" was good, because the recess feature could be smaller than might be possible with other magnets tested. The smaller size of the recess feature could reduce material waste and manufacturing time, and fasteners with thicker rod material that may be sturdier in comparison with other fasteners that have material removed with a deeper recess feature. The strength of the magnetic pull force was not adequate for certain situations.

Example 2: neodymium magnet N45 2"×0.25"×0.25" in rare Earth block. The strength of the magnetic pull force was adequate for certain situations in which the fastener might be used. However, the 2 inch length was too long and the 0.25" depth was too deep for certain situations. The dimensions of the fastener might have to be increased from the exemplary dimensions given hereinabove to use this magnet.

Example 3: N48 neodymium magnet 1"×0.25"×0.125" block. This magnet had the best overall dimensions and characteristics to suit certain situations in which the fastener might be used. The length of 1 inch was adequate to substantially cover a full vertical portion, i.e., the retainer portion, of the hook portion of a length chosen for certain embodiments of the fatstener. The strength of the magnetic pull force is about 8 pounds, which held the fastener in place with great success. The depth of 0.125" allowed for only a little of the material to be removed from the body of the hook portion. By removing only a small amount of material from the hook portion, there may be minimal loss of strength in the hook portion, and the fastener overall.

Example 4: neodymium magnet N42 bar 0.5"×0.125"×1/16". The ½ inch length was a little short to substantially cover a full vertical portion, i.e., the retainer portion, of the hook portion of a length chosen for certain embodiments of the fastener. However, the depth of 1/16" was good, because the recess feature could be smaller than might be possible with other magnets tested. The smaller size of the recess feature could reduce material waste and manufacturing time, and fasteners with thicker rod material that may be sturdier in comparison with other fasteners that have material removed with a deeper recess feature. However, the width of 0.125" was too narrow for certain situations, which caused gaps on both sides of the hook when the magnet was in place. The strength of the magnetic pull force might not adequate for certain situations.

Example 5: neodymium magnet N45 block 1"×0.25"×0.25". The depth of 0.25" was too much for certain embodiments of the fastener, as the depth of 0.25" required removal of too much material from the bar, which might not be adequate for certain situations. The dimensions of the fastener might have to be increased from the exemplary dimensions given hereinabove. The strength of the magnetic pull force was more than adequate for certain situations in which the fastener might be used.

Example 6: N45 rare Earth magnet 1"×0.25" by 1/16" in neodymium bar. The length of 1 inch was adequate to substantially cover a full vertical portion, i.e., the retainer portion, of the hook portion of a length chosen for certain embodiments of the fastener. The depth of 1/16" was good, because the recess feature could be smaller than might be possible with other magnets tested. The smaller size of the recess feature could reduce material waste and manufacturing time, and fasteners with thicker rod material that may be sturdier in comparison with other fasteners that have material removed with a deeper recess feature. The strength of the magnetic pull force was not adequate for certain situations in which the fastener might be used.

Figure 11:
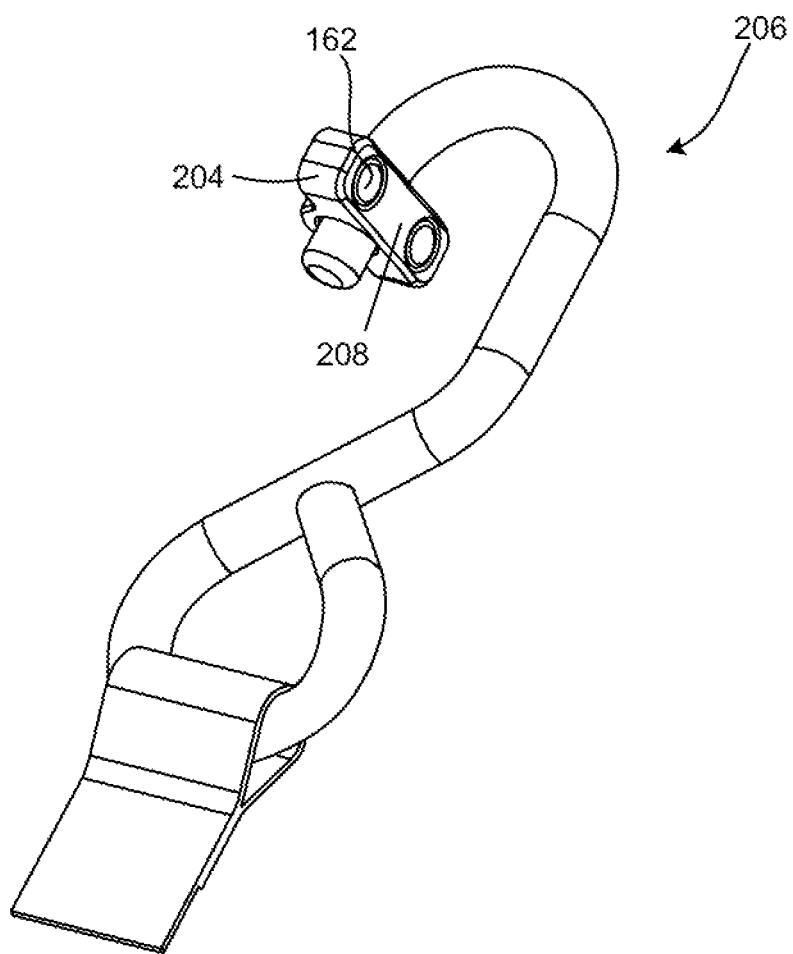
FIG. 11 illustrates a perspective view of a magnetic fastener for cargo retention in accordance with various embodiments of the present disclosure.
Figure 12A:
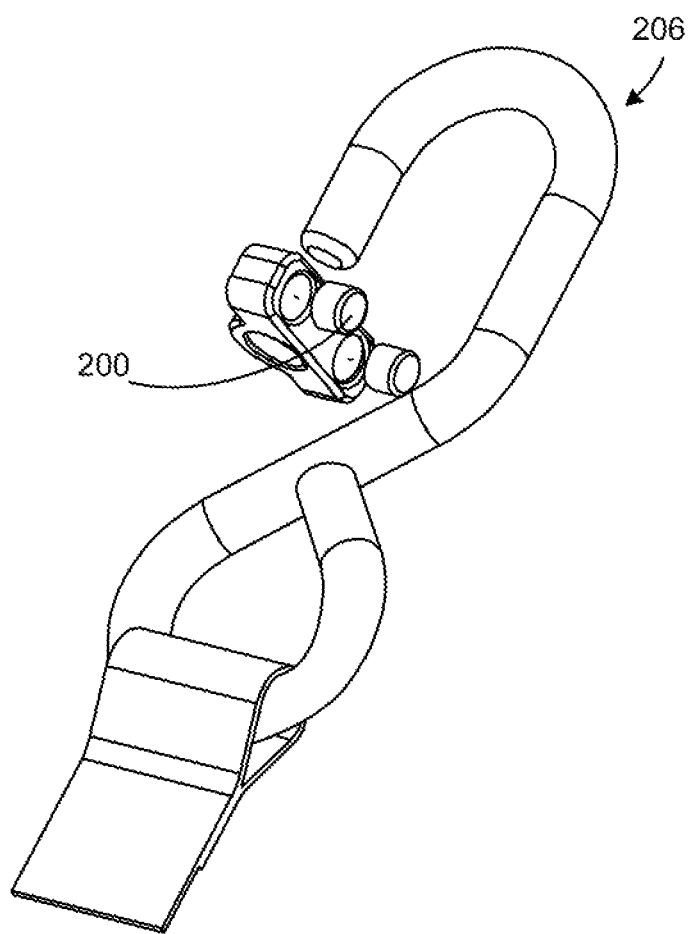
FIG. 12A demonstrates an exploded perspective view of certain aspects of FIG. 11.
Figure 12B:
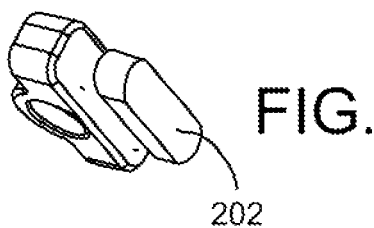
FIG. 12B demonstrates an exploded perspective view of another embodiment of certain aspects of FIG. 11.

FIGS. 11-12B illustrate several views of a magnetic fastener for cargo retention in accordance with various embodiments of the present disclosure. Circular magnets 200 or a bar magnet 202 may be used in a housing 204 that is attached to a fastener 206. The magnet 162 in the housing 204 may be flush with a surface 208 of the housing 204. By being flush with the surface 208 of the housing 204, the magnet is less likely to catch on another object during use. By not catching on another object during use, the magnet is more likely to stay in place in the housing 204 and on the fastener 206. The magnet is held in position in the recess feature 160 during use of the fastener 206. The magnet may be held in position by epoxy, molding, etc. The housing 204 may be attached by friction fit, epoxy, mechanical fastener, or other suitable means. A long axis of the housing 204 may be substantially perpendicular to a long axis of the fastener 206 The housing 204 may be made of metal, polymer or other suitable material.

Figure 13:
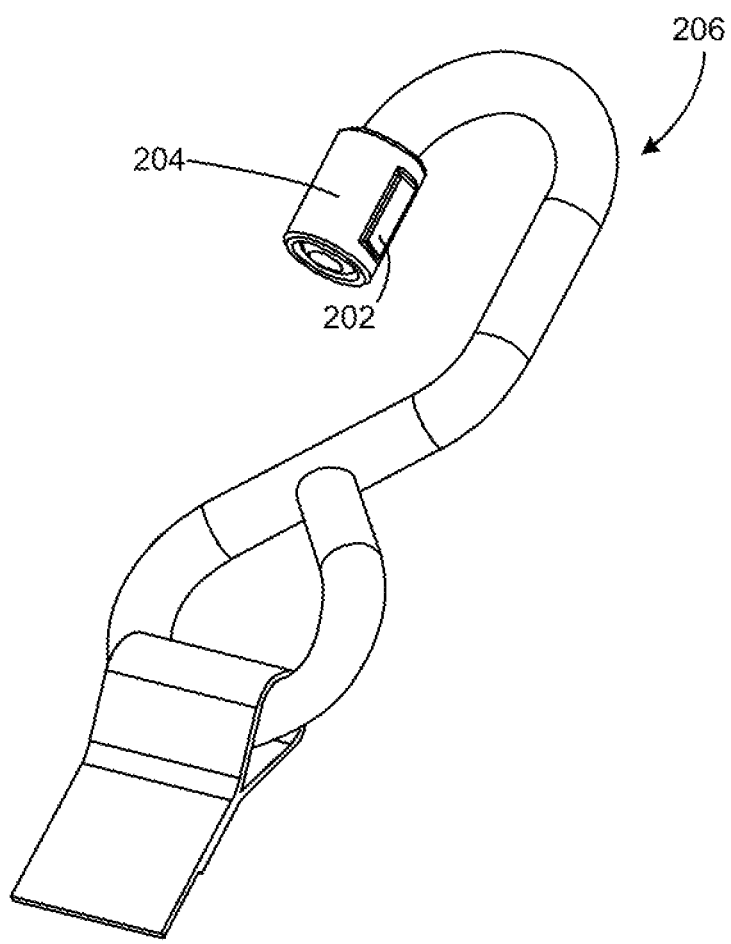
FIG. 13 shows a perspective view of a magnetic fastener for cargo retention in accordance with various embodiments of the present disclosure.
Figure 14:
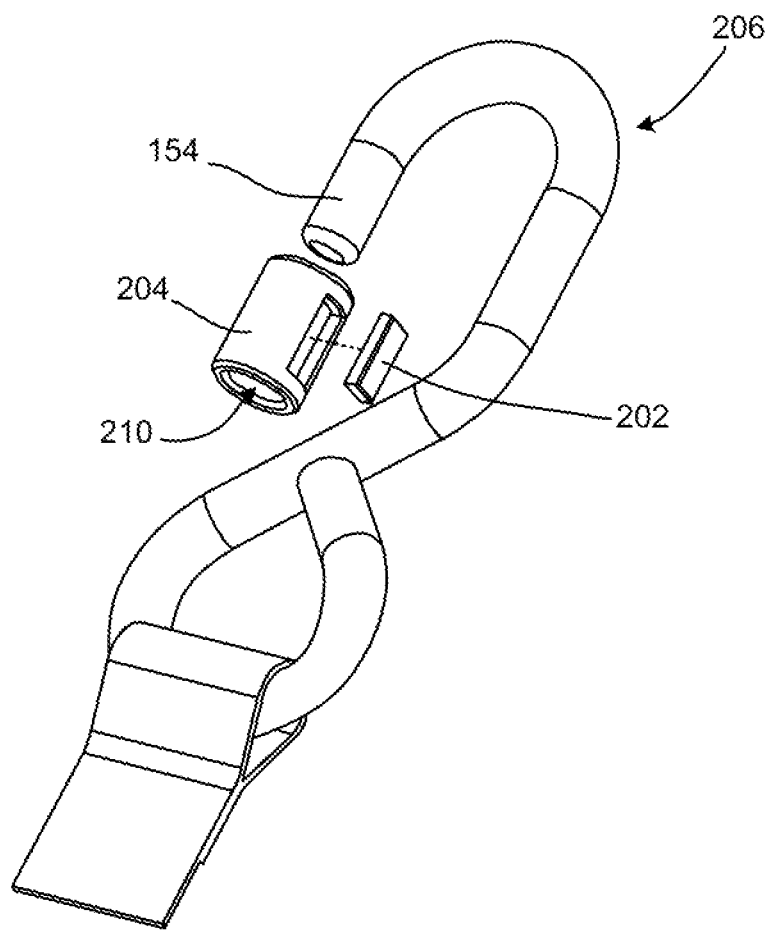
FIG. 14 illustrates an exploded perspective view of certain aspects of FIG. 14.
Figure 15:
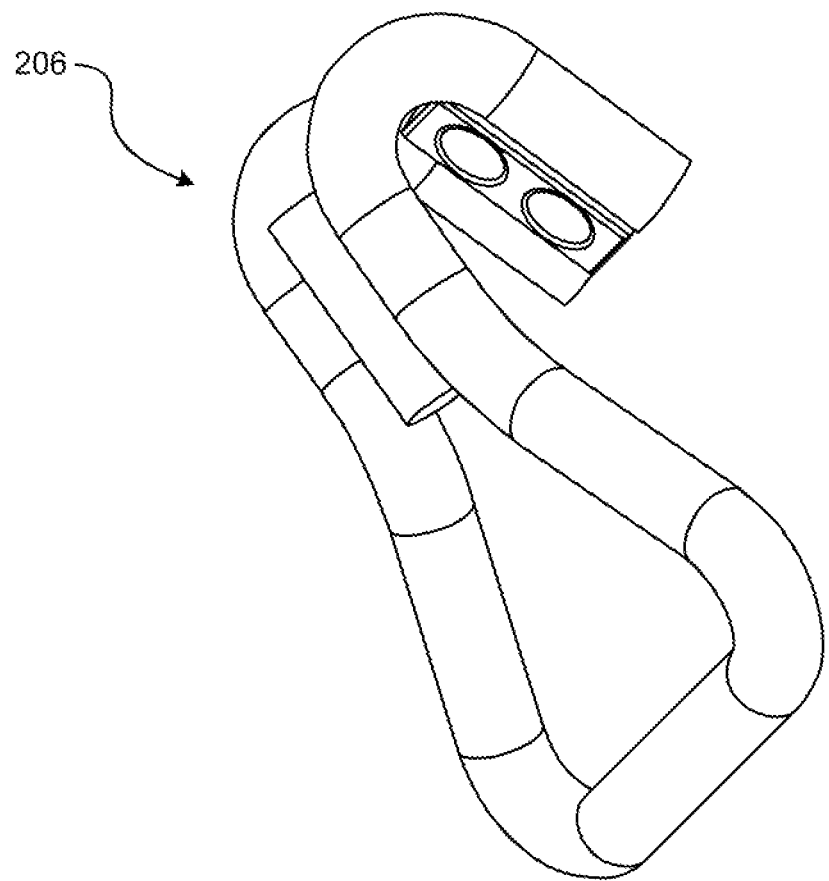
FIG. 15 displays a perspective view of a magnetic fastener for cargo retention in accordance with various embodiments of the present disclosure.
Figure 16:
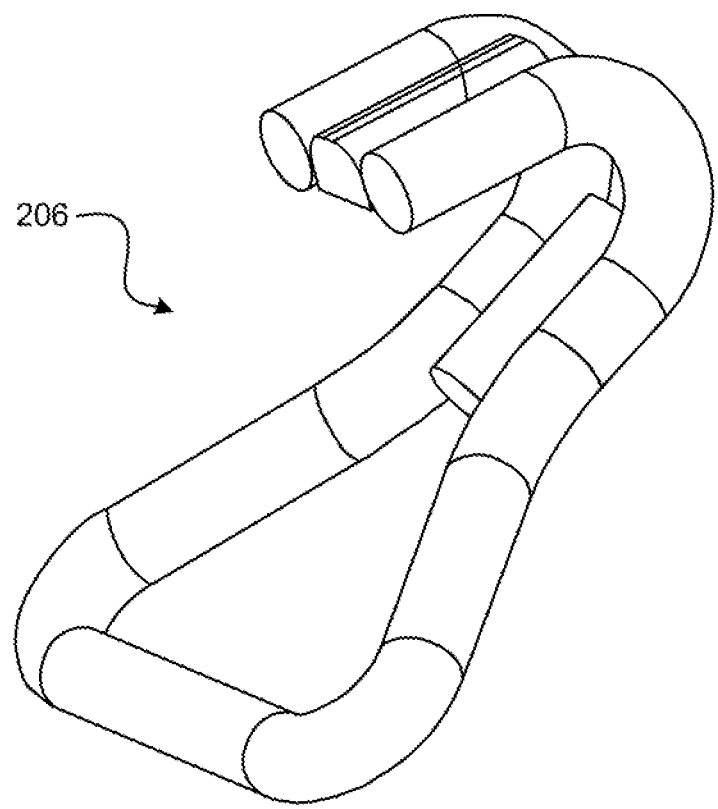
FIG. 16 illustrates an alternative perspective view of certain aspects of FIG. 15.
Figure 17:
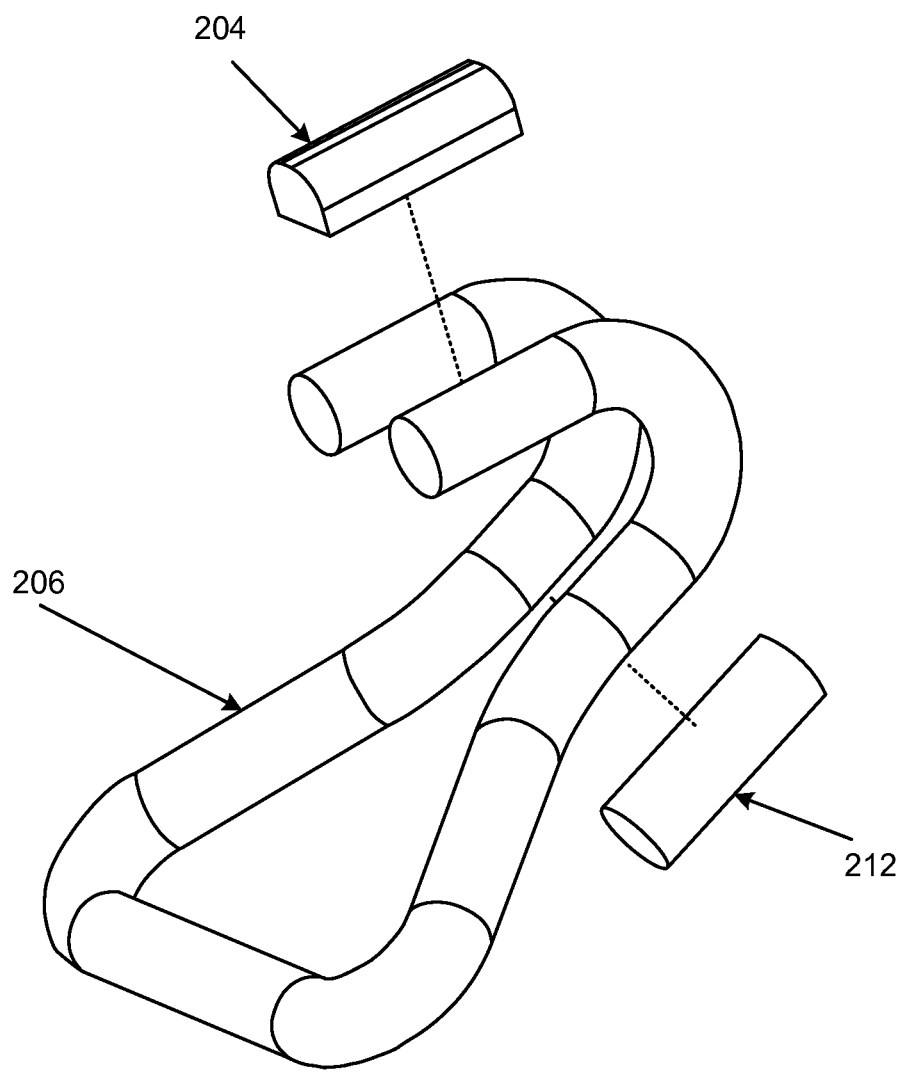
FIG. 17 demonstrates an exploded perspective view of certain aspects of FIG. 15.
Figure 18:
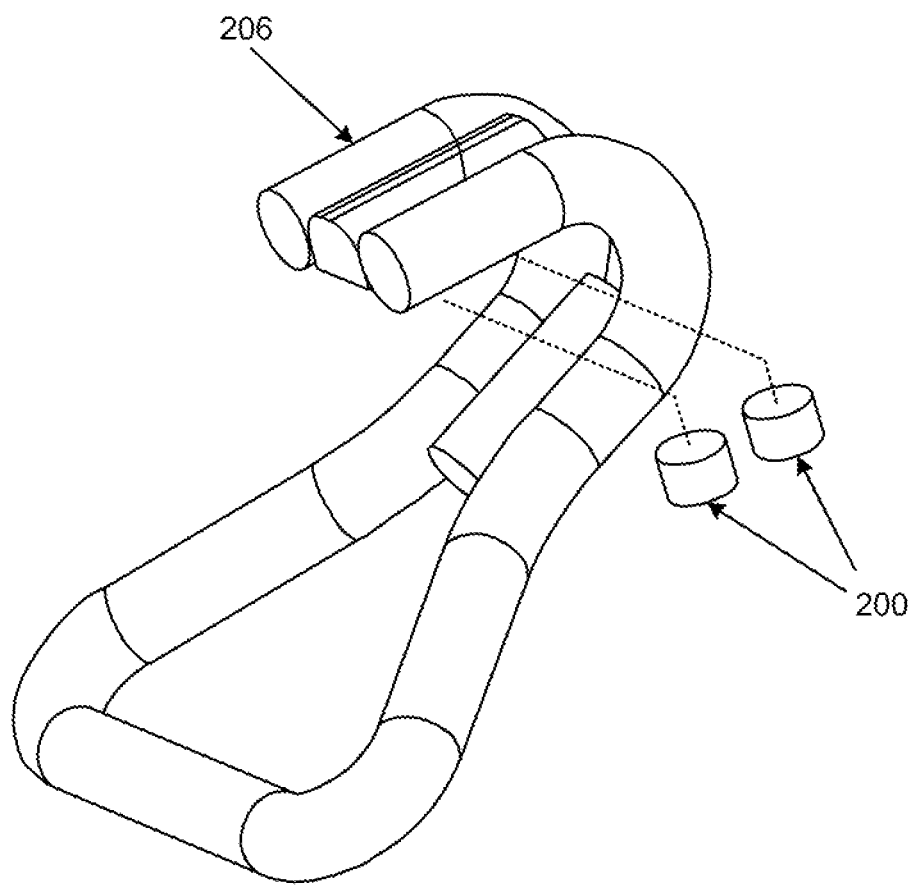
FIG. 18 shows an alternative exploded perspective view of certain aspects of FIG. 15.
Figure 19:
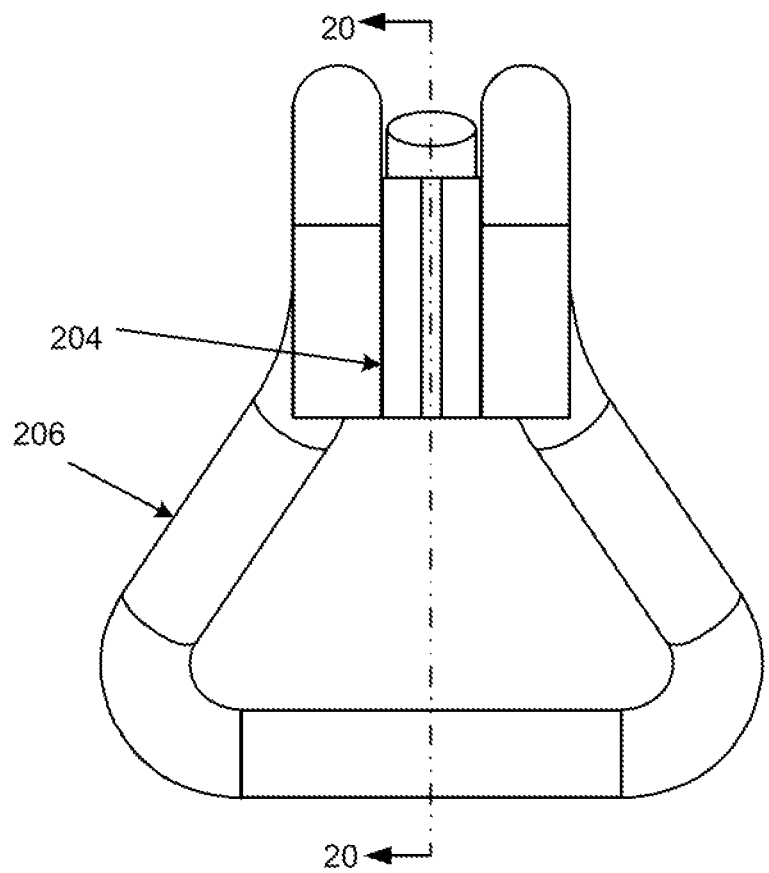
FIG. 19 illustrates a plan view of certain aspects of FIG. 15
Figure 20:
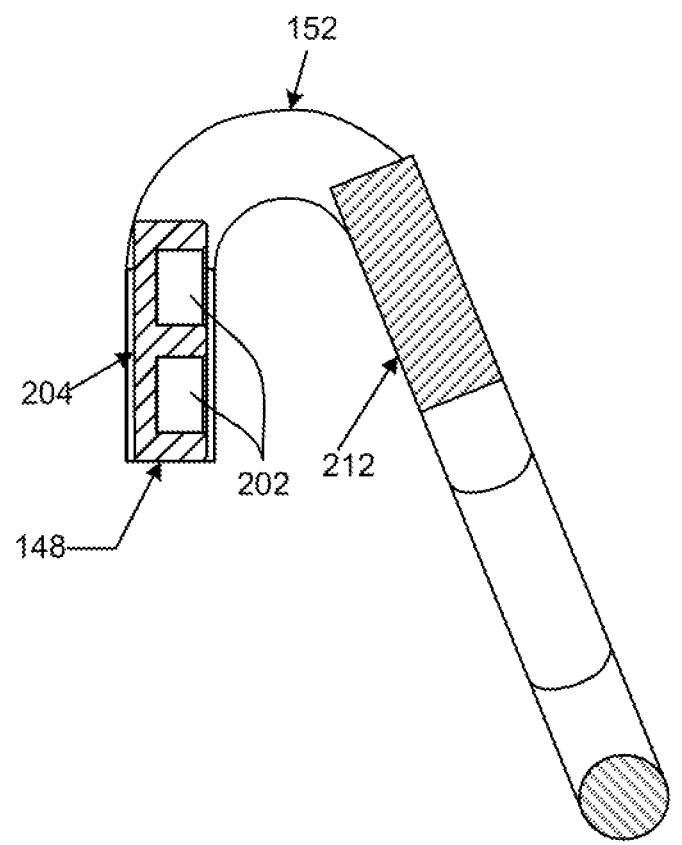
FIG. 20 displays a section view of certain aspects of FIG. 19.
Figure 21:
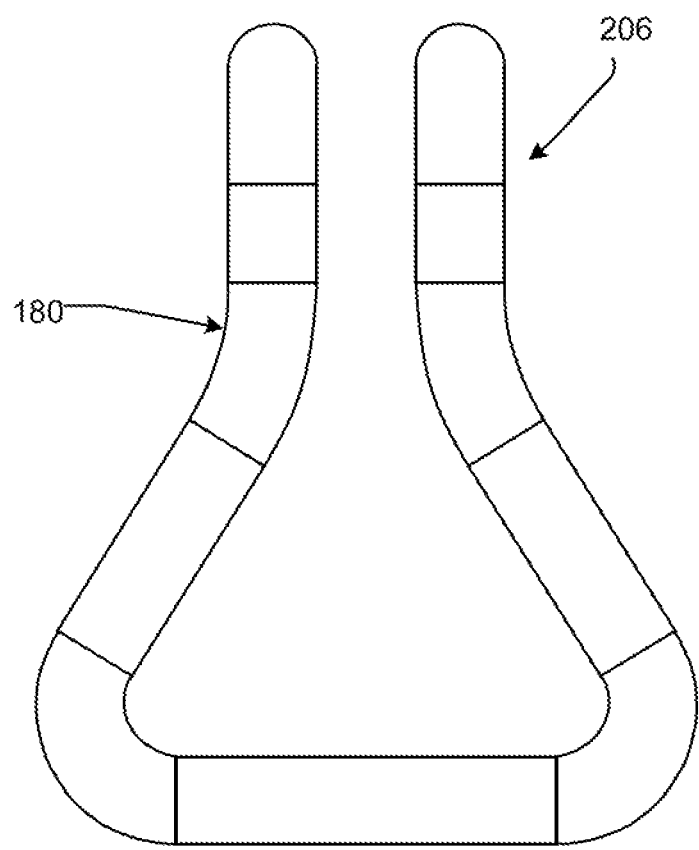
FIG. 21 illustrates a partial plan view of certain aspects of FIG. 15.
Figure 22:
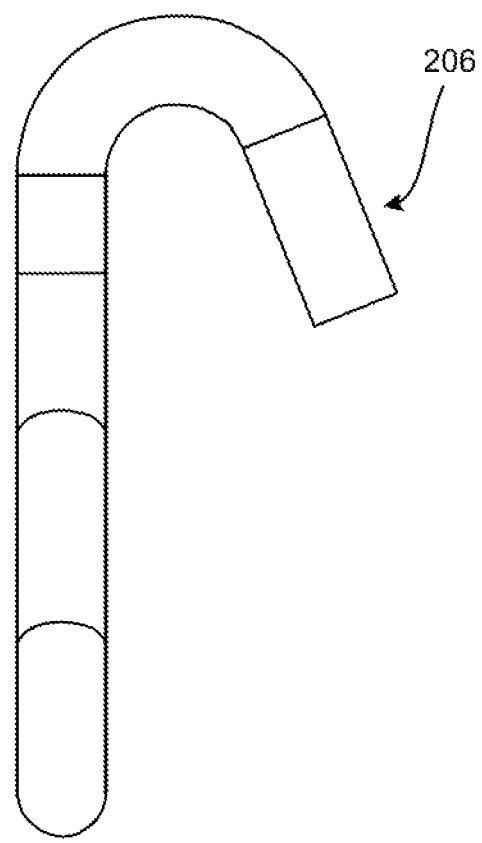
FIG. 22 demonstrates a partial side view of certain aspects of FIG. 15.
Figure 23:
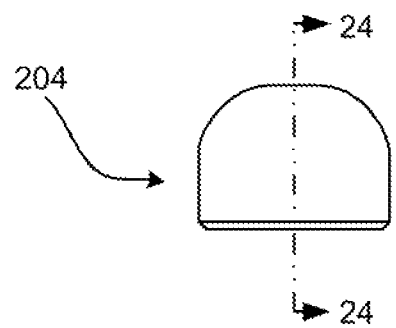
FIG. 23 shows an end view of certain aspects of FIG. 15.
Figure 24:
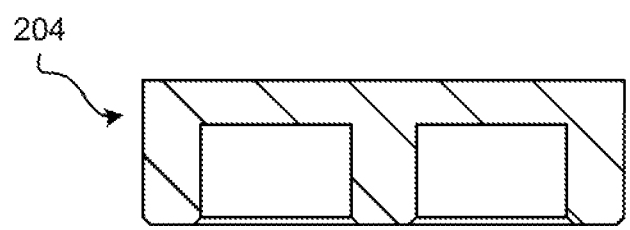
FIG. 24 illustrates a section view of certain aspects of FIG. 23.

FIGS. 13-14 show several views of a magnetic fastener for cargo retention in accordance with various embodiments of the present disclosure. The housing 204 provides an aperture 210 coincident with a long axis of the housing 204. The housing 204 may be slipped into position on the retainer portion 154 of the fastener 206. A bar magnet is shown; however, one or more circular magnets may be used as with other embodiments of the present disclosure. A long axis of the bar magnet or a plurality of circular magnets may be substantially parallel to a length dimension of the retainer portion 154 of the fastener 206.

FIGS. 15-24 display several views of a magnetic fastener for cargo retention in accordance with various embodiments of the present disclosure. This fastener 206 may be considered to have a double rod formation. The magnet may be one or more circular magnets or a bar magnet positioned between the rod formed in the double rod formation. The magnet may be supported in a housing 204 such that the magnet may be substantially flush with a surface of the housing 204. In this case, the magnet is held in position within the recess feature of the housing 204. A support structure 212 may be disposed between the rod formed in the double rod formation to provide additional strength and stability. The support structure 212 may be made of metal, polymer, or other suitable material.

By placing the housing 204 between the first end and the second end of the fastener 206, the aperture is closed for the strap to be retained. In addition, the production costs are lowered, because the fastener 204 does not need to be processed to remove material from the bar that may be bent into the double rod formation. Further, the double rod formation is not weakened by removal of material from the rod. By supplying the support structure 212 opposite the housing, the double rod formation does not need additional bends that would otherwise be necessary to bring the double rods adjacent, even contactingly adjacent, to accommodate the housing 204 between the double rods.

The angle between the extension portion and the retainer portion of the embodiment may be about 20° to about 25°. The angle between the extension portion and the retainer portion of the embodiment is about 22°.

In certain embodiments the method of using the method of the present disclosure may include providing the strap 112 having a magnetic fastener 128 and a mechanical fastener 126. The magnetic fastener 128 may be magnetically coupled to the first side 106 of the cargo retention surface 104. The strap 112 is thrown across the cargo retention surface 104 towards the opposing second side 108 of the cargo retention surface 104 while the strap 112 remains magnetically coupled to the first side 106. The mechanical fastener 126 is mechanically coupled to the opposing second side 108 of the cargo support surface 104. A portion of the strap 112 between the magnetic fastener 128 and the mechanical fastener 126 is shortened. The shortening is achieved by operation of the tightening member 124.

It will be appreciated that the technology described above can readily be utilized in any number of applications, including the transportation device. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A cargo retention device comprising:
    a strap retention portion;
    a strap retained in the strap retention portion;
    a hook portion coupled to the strap retention portion, the hook portion has an inner surface and an opposing, outer surface, wherein the inner surface is inside a generally U-shape of the hook portion;
    a recess feature is disposed on the inner surface, wherein the recess feature is disposed within a volume defined by a rod that forms the hook portion; and
    a magnet is secured within the recess feature.

2. The cargo retention device of claim 1, wherein the recess feature is disposed at an end of the hook portion.

3. The cargo retention device of claim 1, wherein the hook portion comprises:
    an extension portion that extends distally from the strap retention portion;
    a stop portion that extends distally from the extension portion; and
    a retainer portion that extends distally from the stop portion, and the recess feature is disposed on the retainer portion.

4. The cargo retention device of claim 3, wherein the stop portion is curved.

5. The cargo retention device of claim 3, wherein the magnet is secured at a distal boundary of the retainer portion.

6. The cargo retention device of claim 1, wherein the recess feature is formed by machining a portion of material away from the rod.

7. The cargo retention device of claim 1, wherein the recess feature is formed when casting the rod.

* * * * *